United States Patent
Tachibana et al.

(10) Patent No.: US 9,849,892 B2
(45) Date of Patent: Dec. 26, 2017

(54) GUIDE DEVICE FOR GUIDE RAIL-TYPE VEHICLE, AND GUIDE RAIL-TYPE VEHICLE

(71) Applicant: KAWASAKI JUKOGYO KABUSHIKI KAISHA, Kobe-shi, Hyogo (JP)

(72) Inventors: Masaru Tachibana, Kobe (JP); Akihiro Niizeki, Kobe (JP); Junji Kamatani, Kobe (JP); Akira Komoto, Amagasaki (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 203 days.

(21) Appl. No.: 14/774,507

(22) PCT Filed: Mar. 5, 2014

(86) PCT No.: PCT/JP2014/055640
§ 371 (c)(1),
(2) Date: Sep. 10, 2015

(87) PCT Pub. No.: WO2014/141970
PCT Pub. Date: Sep. 18, 2014

(65) Prior Publication Data
US 2016/0052529 A1    Feb. 25, 2016

(30) Foreign Application Priority Data
Mar. 11, 2013   (JP) ................................ 2013-048210

(51) Int. Cl.
*B61F 9/00* (2006.01)
*B61B 13/00* (2006.01)
(Continued)

(52) U.S. Cl.
CPC ................ *B61F 9/00* (2013.01); *B61B 13/00* (2013.01); *B61F 5/38* (2013.01); *B62D 1/265* (2013.01)

(58) Field of Classification Search
CPC ...... B61F 3/00; B61F 3/02; B61F 9/00; B61F 9/005; B61F 13/00; B61B 13/00; B60B 19/00
See application file for complete search history.

(56) References Cited

U.S. PATENT DOCUMENTS 4,265,180 A   5/1981   Uozumi
2012/0103227 A1*   5/2012   Maeyama ............... B61B 13/00
104/245

FOREIGN PATENT DOCUMENTS

JP    S54-115817 A    9/1979
JP    2001-048008 A   2/2001
(Continued)

OTHER PUBLICATIONS

Oct. 7, 2016 Extended European Search Report issued in European Patent Application No. 14 762 569.3.
(Continued)

*Primary Examiner* — Robert J McCarry, Jr.
(74) *Attorney, Agent, or Firm* — Oliff PLC

(57) ABSTRACT

Provided is a guide device for a guide rail-type vehicle which travels while being guided along a travel track. The guide device is provided with: guide wheels which include main guide wheels and branched guide wheels, the main and branched guide wheels being in contact with and roll on guide rails arranged on both sides of the travel track; steering arms which steer the vehicle; and elastic support members which each includes one end affixed to each of the steering arms and which each includes the other end including guide wheels rotatably supported thereon, the elastic support
(Continued)

members absorbing an impact load by deflecting about the one end thereof.

4 Claims, 3 Drawing Sheets

(51) Int. Cl.
  *B62D 1/26* (2006.01)
  *B61F 5/38* (2006.01)

(56) References Cited

FOREIGN PATENT DOCUMENTS

| | | |
|---|---|---|
| JP | 3688461 B2 | 8/2005 |
| JP | 2010-158941 A | 7/2010 |
| JP | 2010-158942 A | 7/2010 |
| JP | 2011-088512 A | 5/2011 |
| JP | 2012-173207 A | 9/2012 |

OTHER PUBLICATIONS

Jun. 3, 2014 Search Report issued in International Patent Application No. PCT/JP2014/055640.

\* cited by examiner

GUIDE DEVICE FOR GUIDE RAIL-TYPE VEHICLE, AND GUIDE RAIL-TYPE VEHICLE

TECHNICAL FIELD

The present invention relates to a guide device for a guide rail-type vehicle that travels on a travel track while guide wheels are abutted on guiding rails arranged on both sides of the travel track for example, and a guide rail-type vehicle including the guide device.

BACKGROUND ART

There is a transit system generally called a new transport system in which a vehicle travels on a preliminarily set travel track. In this transit system, a guide rail-type vehicle that travels by using rubber tires while guide wheels are abutted on guiding rails arranged on both sides of a travel track is provided with guide devices for steering the vehicle. The guide devices are provided on both left and right sides in the vehicle width direction at front and rear parts of a vehicle body. Each of the guide devices includes a guide wheel 10 as shown in FIG. 3. The guide wheels 10 are rotatably provided at ends of guide arms in the front and rear parts of the vehicle body, and each of the guide wheels 10 includes a main guide wheel 11 placed on the upper side, and a turnout guide wheel 12 placed on the lower side thereof. The main guide wheel 11 and the turnout guide wheel 12 are rotated respectively independently.

Meanwhile, on both left and right sides of a travel track 20, guide rails 21 to which the guide wheels 10 are abutted are installed. Each of the guide rails 21 includes a main guide rail 22 installed along the travel track 20, and a diverging guide rail 23 installed at a diverging point of the travel track 20.

Each main guide rail 22 is brought into contact with the main guide wheel 11 from an outer side of the vehicle body and applies inward force P1 toward an inner side of the vehicle body to the vehicle body. Meanwhile, the diverging guide rail 23 is brought into contact with the turnout guide wheel 12 from the inner side of the vehicle body and applies outward force P2 toward the outer side of the vehicle body to the vehicle body. In such a way, while the guide wheels 10 and the guide rails 21 are abutted with each other, the vehicle is guided along the travel track 20 to travel.

Since the guide rail-type vehicle is steered by the guide wheels 10 as described above, the forces P1, P2 upon abutment between the guide wheels 10 and the guide rails 21 act on the vehicle body. Therefore, an excessive action of the inward force P1 and the outward force P2, that is, an action of an impact load invites shorter life of the guide device, generation of noises, a lowered quality of ride, and the like. Thus, in the guide device, a shock-absorbing device that mitigates the inward force P1 and the outward force P2 is provided (for example, Patent Documents 1 to 3).

PRIOR ART DOCUMENTS

Patent Documents

Patent Document 1: Japanese Patent No. JP 3688461
Patent Document 2: Japanese Patent Laid-open Publication No. JP 2011-88512
Patent Document 3: Japanese Patent Laid-open Publication No. JP 2010-158941

SUMMARY OF THE INVENTION

Problems to be Solved by the Invention

As the above shock-absorbing device, for example the Patent Document 1 discloses a structure including an L-shape lever, and a shock-absorbing elastic member. One end of the L-shape lever is turnably attached to a tip end of the above guide arm via a support shaft, and supported via the shock-absorbing elastic member. The above main guide wheel 11 and the turnout guide wheel 12 are rotatably attached to the other end of the L-shape lever. Therefore, when the main guide wheel 11 and the turnout guide wheel 12 are rolled in contact with the main guide rail 22 and the diverging guide rail 23 as described above, the L-shape lever is turned about the support shaft on the one end part thereof. At this time, part of force relating to this turn (corresponding to the forces P1, P2 described above) is absorbed by the shock-absorbing elastic member, and excessive inward force P1 and excessive outward force P2 are suppressed from acting on the vehicle body.

However, in the shock-absorbing device disclosed in the Patent Document 1, the guide arm further has the L-shape lever and the shock-absorbing elastic member as described above. Thus, the structure of the guide arm is complicated and the number of parts is increased. Therefore, there is a problem that a maintenance property is not favorable.

The Patent Document 2 also discloses a similar structure to the above configuration of the Patent Document 1, and discloses the structure including a tabular guide link, and a shock-absorbing rubber or a shock-absorbing mechanism. The guide link corresponds to the L-shape lever of the Patent Document 1, and the shock-absorbing rubber or the shock-absorbing mechanism corresponds to the shock-absorbing elastic member of the Patent Document 1. The guide link and the shock-absorbing rubber or the shock-absorbing mechanism act in a similar way to the L-shape lever and the shock-absorbing elastic member.

Therefore, even in the shock-absorbing device of the Patent Document 2, the structure thereof is complicated and the number of parts is high, and there is a problem that the maintenance property is not favorable.

The Patent Document 3 discloses a configuration that a shock-absorbing device is provided in the above main guide wheel 11 and the turnout guide wheel 12. As described above, the main guide wheel 11 and the turnout guide wheel 12 are rotatably supported on a wheel shaft of the guide arm via bearings. The shock-absorbing device of the Patent Document 3 has a structure in which shock-absorbing members are placed between the wheel shaft and the bearings.

By the shock-absorbing members arranged in such a way, part of the above inward force P1 acting on the main guide wheel 11 and part the above outward force P2 acting on the turnout guide wheel 12 are absorbed, so that excessive force P1 and excessive force P2 are suppressed from acting on the vehicle body.

In the shock-absorbing device of the Patent Document 3 with such configuration, the shock-absorbing member is provided in each of the main guide wheel 11 and the turnout guide wheel 12. Thus, there is a problem that manufacturing cost is increased. In the turnout guide wheel 12 placed on the lower side, there is a problem that an anti-drop measure for a case where the shock-absorbing member installed in the turnout guide wheel 12 is detached is required.

The present invention is achieved in order to solve the above-described problems, and an object of the present invention is to provide a guide device for a guide rail-type vehicle including a simple structure in comparison to the conventional examples with which maintenance is easily performed, and a guide rail-type vehicle including the guide device.

Solutions to the Problems

In order to achieve the above object, the present invention is configured as follows.

That is, a guide device for a guide rail-type vehicle in a first aspect of the present invention is a guide device for a guide rail-type vehicle traveling along a travel track while being guided along the travel track, comprising:

guide wheels rolled by coming in contact with guide rails including main guide rails and diverging guide rails arranged on both sides of the travel track, each of the guide wheels including a main guide wheel and a turnout guide wheel, each of the main guide rails applying inward force toward an inner side of the guide rail-type vehicle to the main guide wheel, and each of the diverging guide rails applying outward force toward an outer side of the guide rail-type vehicle to the turnout guide wheel;

steering arms displaced upon receiving the inward force or the outward force and steer the vehicle;

a flexible support member extending in a vehicle longitudinal direction, one end of the flexible support member being fixed to a tip end of each of the steering arms as a fixed end and the other end of the flexible support member rotatably supporting the main guide wheel and the turnout guide wheel, and the flexible support member absorbing the inward force and the outward force by deflection of the flexible support member with respect to the one end serving as a supporting point thereby suppressing an impact load transmitted to the steering arm.

Since the flexible support member including the one end fixed to the tip end of the steering arm and the other end rotatably supporting the guide wheel is provided, part of force applied to the guide wheel by the guide rails is absorbed by the deflection of the flexible support member, so that the flexible support member performs a buffering action. Due to the above configuration, the structure in which the flexible support member is used is a simple structure in comparison to the conventional examples with which maintenance is easily performed. Due to the simple structure, manufacturing cost can also be reduced.

A guide rail-type vehicle in a second aspect of the present invention includes the guide device in the first aspect, wherein the guide wheel included in the guide device is rolled by coming in contact with guide rails arranged on both sides of the travel track, so that the steering arm included in the guide device is steered and the guide rail-type vehicle travels along the travel track.

Effects of the Invention

According to the guide device for the guide rail-type vehicle in the first aspect and the guide rail-type vehicle in the second aspect of the present invention, the guide device for the guide rail-type vehicle including a simple structure in comparison to the conventional examples at inexpensive manufacturing cost with which maintenance is easily performed can be provided, and the guide rail-type vehicle including the guide device can be provided.

EMBODIMENTS OF THE INVENTION

Hereinafter, a guide device for a guide rail-type vehicle in an embodiment, and a guide rail-type vehicle including the guide device will be described with reference to the drawings. It should be noted that in the figures, the same or similar constituent parts will be given the same reference signs. In order to avoid unnecessarily redundant description and facilitate understanding of those skilled in the art, detailed description of the already well-known matters and duplicated description of the substantially same configurations will sometimes be omitted. Contents of the following description and the accompanying drawings do not intend to limit the scope described in the claims.

Figure 2A:
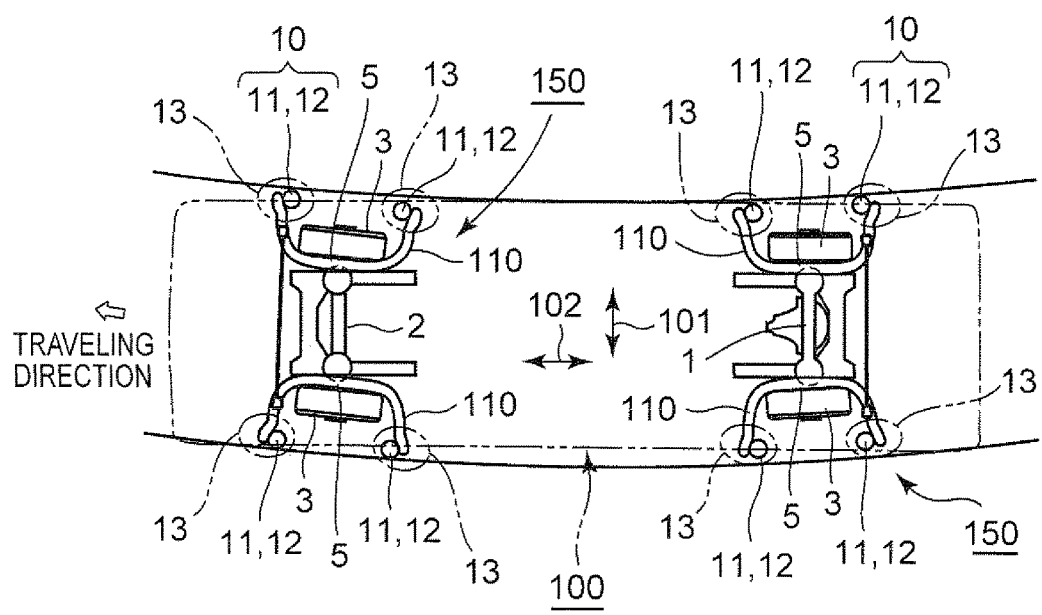
FIG. 2A is a plan view showing a schematic configuration of a guide rail-type vehicle in the embodiment.
Figure 2B:
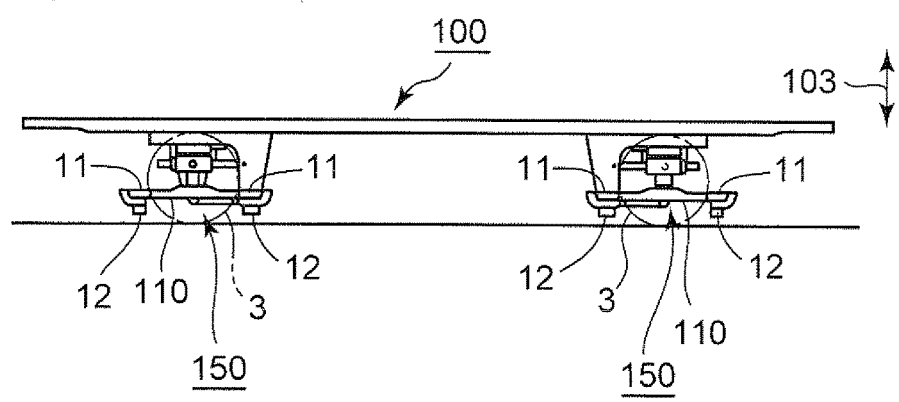
FIG. 2B is a side view of the guide rail-type vehicle shown in FIG. 2A.
Figure 3:
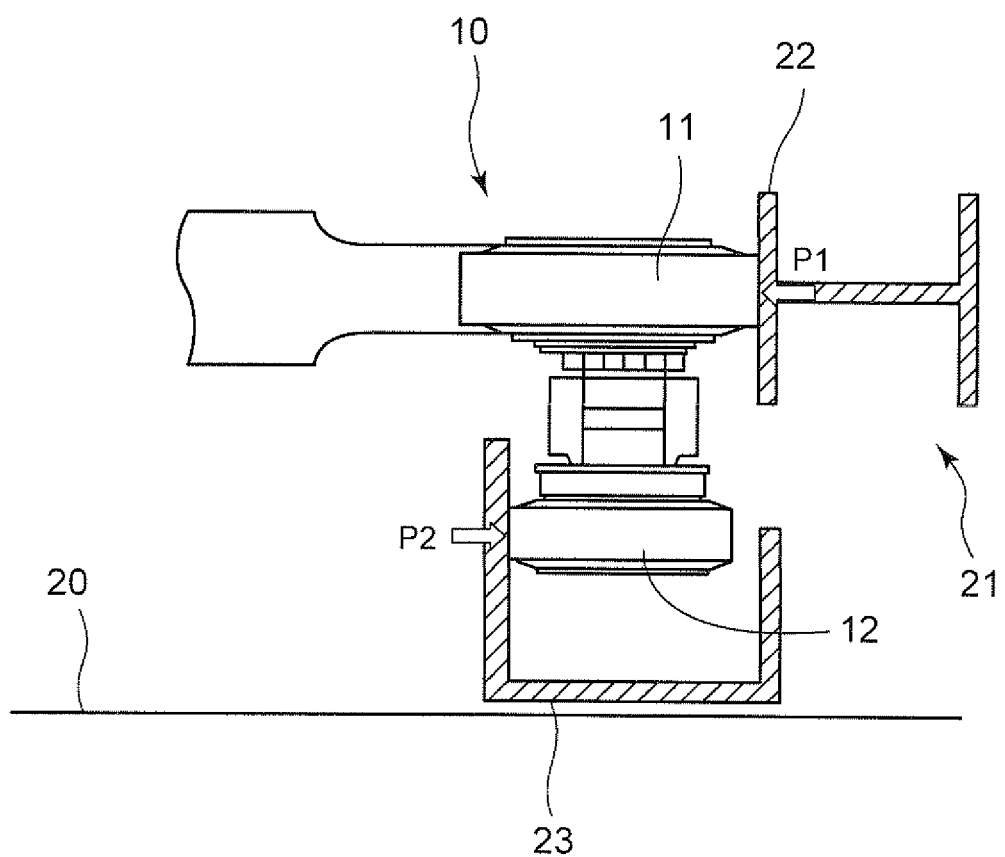
FIG. 3 is a view showing a guide device and a guide rail in a general guide rail-type vehicle.

Firstly, with reference to FIGS. 2A and 2B, a guide rail-type vehicle 100 in the present embodiment, and guide devices 150 provided in the vehicle 100 will be schematically described. It should be noted that a reference sign 101 denotes a vehicle width direction of the vehicle 100, a reference sign 102 denotes a vehicle longitudinal direction, and a reference sign 103 denotes a vertical direction. The vehicle width direction 101, the vehicle longitudinal direction 102, and the vertical direction 103 are orthogonal to each other.

In the guide rail-type vehicle 100, an axle 1 corresponds to a drive shaft and an axle 2 corresponds to a driven shaft. The axle 1 is coupled to a drive mechanism and is driven and rotated. Travel wheels 3 of rubber tires are turnably supported on a perpendicular plane on both ends of the axle 1 and the axle 2 via bearing portions 5. A steering arm 110 formed in a U-shape in a plan view is attached to each of the bearing portions 5 so as to surround the travel wheel 3. At each of tip ends of one steering arm 110 in respective steering arms 110, a guide wheel 10 including a main guide wheel 11 and a turnout guide wheel 12 is turnably attached to the tip end. As already described, when main guide rails 22 installed along a travel track 20 are abutted on the main guide wheels 11, inward force P1 acts on the main guide wheels 11, and when diverging guide rails 23 are abutted on the turnout guide wheels 12, outward force P2 acts on the turnout guide wheels 12. By the inward force P1 and the outward force P2, the steering arms 110, the bearing portions 5, and the travel wheels 3 are integrally turned about kingpins, so that the vehicle 100 is guided and steered.

It should be noted that a group of each tip end of the steering arm 110, the guide wheel 10 on each tip end of the steering arm 110, and an attachment part 13 of the guide wheel 10 on each tip end of the steering arm 110 corresponds to the guide device 150. The guide device 150 will be described in detail below.

Figure 1A:
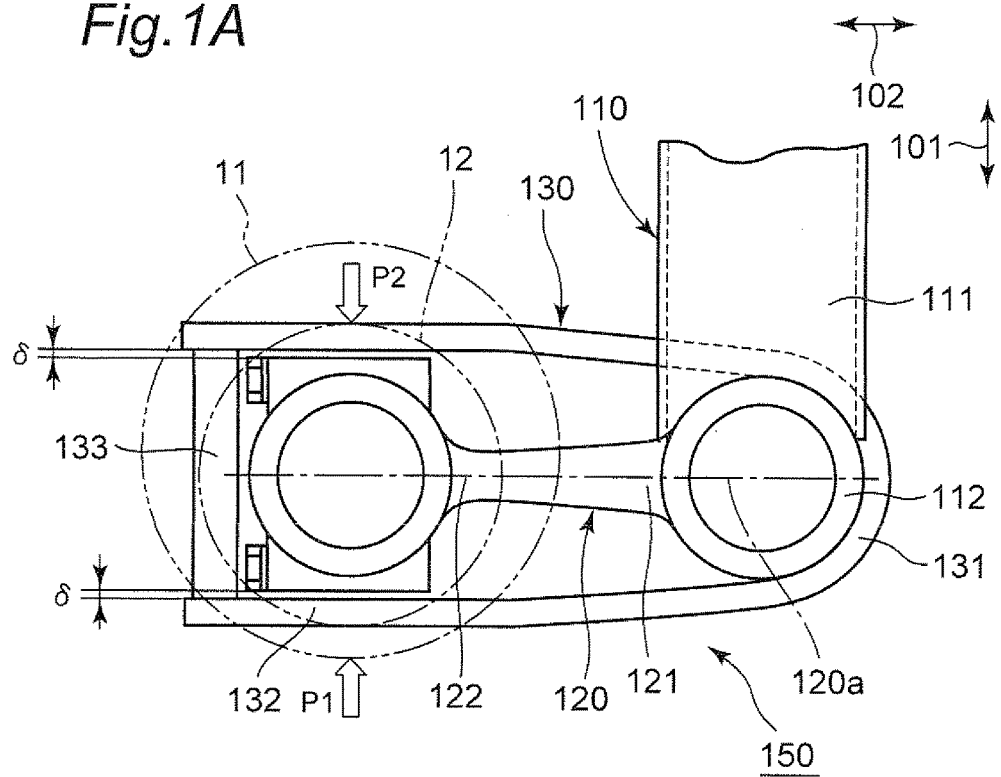
FIG. 1A is a plan view showing a configuration of a guide device in an embodiment.
Figure 1B:
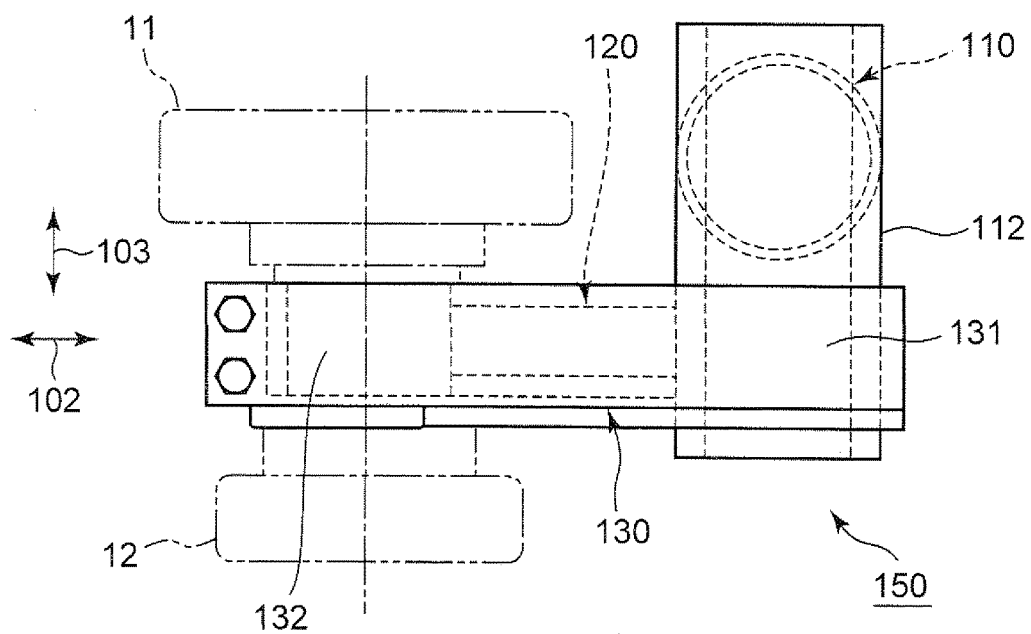
FIG. 1B is a side view of the guide device shown in FIG. 1A.

The guide device 150 will be described in detail with reference to FIGS. 1A and 1B. It should be noted that FIG. 1A is an enlarged plan view showing one of attachment parts 13 of the guide wheels 10 in the tip ends of each of the steering arms 110 shown in FIG. 2A, and FIG. 1B is a side view thereof. Hereinafter, the attachment part 13 at one tip end of each of the steering arms 110 will be described. However, other attachment parts 13 are similarly configured.

In the present embodiment, the guide device 150 includes the steering arm 110, the guide wheel 10 including the main guide wheel 11 and the turnout guide wheel 12, and a cantilever member 120 as a basic configuration. The guide device 150 can further include a limiting member 130. The steering arm 110 and the guide wheel 10 including the main guide wheel 11 and the turnout guide wheel 12 are described above. Hereinafter, the cantilever member 120, and further, the limiting member 130 will be mainly described.

An attaching member 112 for attaching the cantilever member 120 to the steering arm 110 is fixed to a tip end 111 of the steering arm 110 along the vertical direction 103. Although a pipe material is used as the attaching member 112 as one example, the present embodiment is not limited to this. The cantilever member 120 can also be fixed directly to the tip end 111 of the steering arm 110 without the attaching member 112.

The cantilever member 120 is a member corresponding to one example of a flexible support member, and for example formed from a plate material such as spring steel. One end 121 of the cantilever member 120 is fixed to the tip end 111 of the steering arm 110 via the attaching member 112 as a fixed end, and the cantilever member 120 extends to a side of the travel wheel 3 along the vehicle longitudinal direction 102. The other end 122 of the cantilever member 120 rotatably supports the main guide wheel 11 and the turnout guide wheel 12. It should be noted that in the present embodiment, a rotation center position of the turnout guide wheel 12 matches with an axial center 120a of the cantilever member 120, and the main guide wheel 11 is attached so as to be eccentric with respect to the turnout guide wheel 12 toward an inner side of the vehicle.

In the other end 122 of the cantilever member 120, by abutting the main guide rail 22 with the main guide wheel 11, the inward force P1 toward the inner side of the vehicle 100 acts on the main guide wheel 11, and by abutting the diverging guide rail 23 with the turnout guide wheel 12, the outward force P2 toward an outer side of the vehicle 100 acts on the turnout guide wheel 12. Therefore, by actions of the inward force P1 and the outward force P2, the cantilever member 120 can be bent with respect to the one end 121 serving as a supporting point. By this deflection, the inward force P1 and the outward force P2 are buffered, that is, the inward force P1 and the outward force P2 acting on the steering arm 110 are absorbed and an impact load can be suppressed from acting directly on the steering arm 110. Meanwhile, the buffered inward force P1 and the buffered outward force P2 act on the steering arm 110 via the cantilever member 120. Thus, the steering arm 110 is displaced following the main guide rail 22 and the diverging guide rail 23 so as to steer.

Thus, by providing the cantilever member 120, shorter life of the guide device 150, generation of noises, a lowered quality of ride, and the like can be prevented. Further, as described above, the guide device 150 has the configuration that the cantilever member 120 is just attached to the tip end 111 of the steering arm 110. Thus, the guide device has a simple structure in comparison to the conventional examples with which maintenance is easily performed. Due to the simple structure, manufacturing cost can also be reduced.

Next, the limiting member 130 will be described.

As already described, the guide rails 21 with which the guide wheels 10 are abutted are installed on both the left and right sides of the travel track 20. However, in a case where a gap between the guide wheel 10 and the guide rail 21 is larger more than necessary, a steering operation may become rough and it may be concerned that the quality of ride and the like are deteriorated. In such a situation, in a case a buffering action by the cantilever member 120 is further performed, there is a possibility that an oscillating amount in right and left of the vehicle 100 may be more increased.

Therefore, in order to limit a deflection amount, that is, the oscillating amount of the cantilever member 120 with respect to the fixed end serving as the supporting point, the limiting member 130 can be mounted to the tip end of the steering arm 110, As shown in the figures, the limiting member 130 is formed with a plate material extending along the cantilever member 120 on both sides of the cantilever member 120 in the vehicle width direction 101 in non-contact with the cantilever member 120. One end 131 of the limiting member is fixed to the tip end 111 of the steering arm 110 via the attaching member 112, and the other ends 132 are coupled to each other by a coupling member 133. It should be noted that in the present embodiment, as shown in the figures, the limiting member 130 uses the plate material which is made by forming one plate material into a U-shape, however the present embodiment is not limited to this. Namely, plate materials may be respectively arranged on both sides of the cantilever member 120.

At the other ends 132 of the limiting member 130 installed as above, respective gaps δ are set between each of the other ends 132 of the limiting member 130 installed and the cantilever member 120 in the vehicle width direction 101. When the inward force P1 or the outward force P2 such that the cantilever member 120 is bent exceeding the gap δ is applied, the cantilever member 120 is abutted on the limiting member 130. Thus, the deflection amount of the cantilever member 120 is limited.

The gap δ is a value determined on a basis of design conditions with respect to respective guiding rails. The value is approximately 1 mm as one example in the embodiment.

An operation of the guide devices 150 in the guide rail-type vehicle 100 configured as described above will be briefly described.

As already described, when the vehicle 100 travels on the travel track 20, the main guide rails 22 and the diverging guide rails 23 installed on the travel track 20 are abutted on the main guide wheels 11 and the turnout guide wheels 12 in the guide devices 150. At this time, the inward force P1 acting on the main guide wheels 11 and the outward force P2 acting on the turnout guide wheels 12 are buffered by the deflection of the cantilever members 120. Therefore, generation of noises, a lowered quality of ride, and the like are prevented.

When the limiting members 130 are installed, the deflection of the cantilever members 120 excessing a specified value is limited by the limiting members 130, so that generation of noises, a lowered quality of ride, and the like are further prevented.

While the operation above is repeated, the vehicle 100 travels along the travel track 20.

The present invention is sufficiently described relating to the preferred embodiment with reference to the accompanying drawings. However, for those skilled in the art, various modifications and corrections are obviously available. It should be understood that such modifications and corrections are included in the scope of the present invention by the accompanying claims unless the modifications and the corrections depart from the scope.

All the disclosed contents of the description, the drawings, the claims, and the abstract of Japanese Patent Application No. JP 2013-48210 filed on Mar. 11, 2013 are incorporated into the present description as a reference.

INDUSTRIAL APPLICABILITY

The present invention can be applied to a guide device for a guide rail-type vehicle that travels on a travel track while guide wheels are abutted on guiding rails, and a guide rail-type vehicle including the guide device.

DESCRIPTION OF REFERENCE SIGNS

10: Guide wheel
11: Main guide wheel
12: Turnout guide wheel
21: Guide rail
22: Main guide rail
23: Diverging guide rail
100: Guide rail-type vehicle
110: Steering arm
120: Cantilever member
121: One end
122: Other end
130: Limiting member
150: Guide device

The invention claimed is:

1. A guide device for a guide rail-type vehicle traveling along a travel track while being guided along the travel track, the guide device comprising:
  a plurality of guide wheels rolled by coming in contact with a plurality of guide rails, the plurality of guide rails including main guide rails and diverging guide rails, arranged on both sides of the travel track, each of the plurality of guide wheels including a main guide wheel and a turnout guide wheel, the main guide rails applying inward force to the main guide wheels toward an inner side of the guide rail-type vehicle, and the diverging guide rails applying outward force to the turnout guide wheels toward an outer side of the guide rail-type vehicle;
  a plurality of steering arms to steer the vehicle being displaced upon receiving the inward force or the outward force; and
  a flexible support member extending in a vehicle longitudinal direction, one end of the flexible support member being fixed to a tip end of each of the plurality of steering arms as a fixed end, and another end of the flexible support member rotatably supporting the main guide wheel and the turnout guide wheel, the flexible support member absorbing the inward force and the outward force by deflection of the flexible support member with respect to the fixed end serving as a supporting point, thereby suppressing an impact load transmitted to each steering arm.

2. The guide device for the guide rail-type vehicle according to claim 1, wherein the flexible support member is a cantilever member.

3. The guide device for the guide rail-type vehicle according to claim 1, further comprising a limiting member limiting a deflection amount of the flexible support member, the limiting member: (i) being attached to the tip end of each steering arm, (ii) extending along the flexible support member on both sides of the flexible support member in a vehicle width direction in non-contact with the flexible support member, and (iii) limiting the deflection amount of the flexible support member by abutment between the flexible support member and the limiting member.

4. A guide rail-type vehicle comprising:
  a guide device for a guide rail-type vehicle traveling along a travel track while being guided along the travel track, the guide device including:
    a plurality of guide wheels rolled by coming in contact with a plurality of guide rails, the plurality of guide rails including main guide rails and diverging guide rails, arranged on both sides of the travel track, each of the plurality of guide wheels including a main guide wheel and a turnout guide wheel, the main guide rails applying inward force to the main guide wheels toward an inner side of the guide rail-type vehicle, and the diverging guide rails applying outward force to the turnout guide wheels toward an outer side of the guide rail-type vehicle;
    a plurality of steering arms to steer the vehicle being displaced upon receiving the inward force or the outward force; and
    a flexible support member extending in a vehicle longitudinal direction, one end of the flexible support member being fixed to a tip end of each of the plurality of steering arms as a fixed end, and another end of the flexible support member rotatably supporting the main guide wheel and the turnout guide wheel, the flexible support member absorbing the inward force and the outward force by deflection of the flexible support member with respect to the fixed end serving as a supporting point, thereby suppressing an impact load transmitted to each steering arm.

* * * * *